B. F. WEYMAN.
Snuff-Package.
No. 8,264. Reissued May 28, 1878.
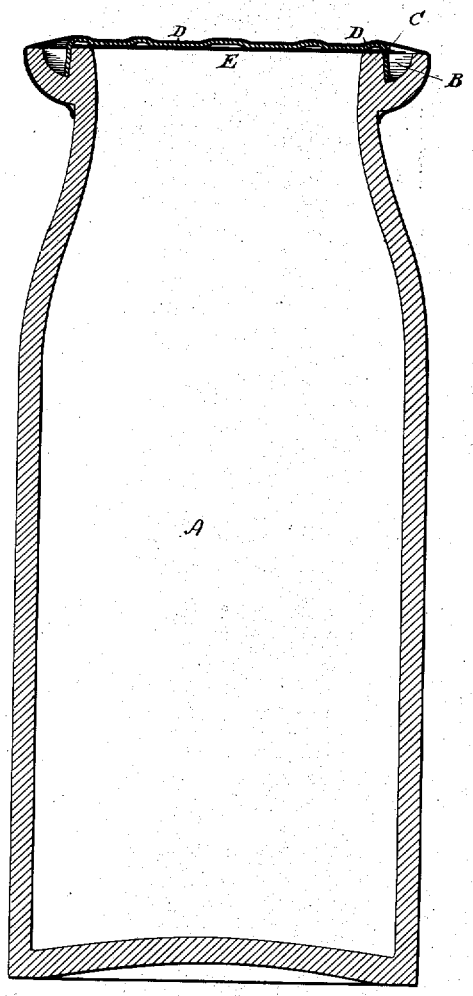
WITNESSES:
C. Clarence Poole
Bartram Zevely
INVENTOR:
B. Frank Weyman
per attys A. H. Evans & Co

UNITED STATES PATENT OFFICE.

B. FRANK WEYMAN, OF PITTSBURG, PENNSYLVANIA.

IMPROVEMENT IN SNUFF-PACKAGES.

Specification forming part of Letters Patent No. 199,128, dated January 8, 1878; Reissue No. 8,264, dated May 28, 1878; application filed May 20, 1878.

*To all whom it may concern:*

Be it known that I, B. FRANK WEYMAN, of the city of Pittsburg and State of Pennsylvania, have invented certain new and useful Improvements in Packages for Containing Snuff, of which the following specification is a clear, full, and exact description, reference being had to the accompanying drawing, making a part of this specification, in which the figure is a vertical section of my improved snuff-package.

This invention relates to useful improvements in packages for containing snuff, whereby the same is kept air-tight and the cover easily and quickly removed or replaced when desired; and the invention consists of a glass or ceramic jar having a groove upon its top, within which a tin cup-shaped cover rests, in combination with an outer tin-foil covering for inclosing the flaring neck of the jar, as will be hereinafter fully described.

To enable others skilled in the art to make and use my invention, I will proceed to describe the exact manner in which I have carried it out.

In the drawing, A represents a jar, within which the snuff is packed. The top of the jar is provided with a groove, B, within which fits the edge of the tin cup-shaped cover C. The tin-foil D, placed over the top of the jar and cover C, serves the purpose of covering the flaring neck of the jar and securing the cover in position. This tin-foil is made large enough to extend down and be tightly compressed around the neck of the jar, thus affording a cheap and ready means of securely holding the tin cover C in position. A sheet of tin-foil or other suitable packing, E, is also placed over the mouth of the jar before the tin cover is placed thereon, thus affording an air-tight packing for the jar.

I am aware that jars having a groove upon the top, within which fits a cover, are old, and such I do not claim; but,

Having thus described my invention, what I claim as new, and desire to secure by Letters Patent, is—

The herein-described package of snuff, consisting of a jar, A, having a groove, B, in its top, and a tin cup-shaped cover, C, in combination with the outer tin-foil covering D, inclosing the flaring neck of the jar and covering inner cover C, and with the inner packing E, substantially as specified.

B. FRANK WEYMAN.

Witnesses:

WM. OETTING,

W. N. PAXTON.